United States Patent [19]
Pitzer

[11] 3,870,657
[45] Mar. 11, 1975

[54] ALUMINA-SUPPORTED CATALYSTS HAVING SUBSTANTIAL AREA IN LARGE PORES

[75] Inventor: Emory W. Pitzer, Bartlesville, Okla.

[73] Assignee: Phillips Petroleum Company, Bartlesville, Okla.

[22] Filed: Jan. 17, 1973

[21] Appl. No.: 324,392

Related U.S. Application Data

[63] Continuation-in-part of Ser. No. 81,600, Oct. 16, 1970, Pat. No. 3,726,936.

[52] U.S. Cl. .............................. 252/464, 252/466 J
[51] Int. Cl. ...................... B01j 11/06, B01j 11/32
[58] Field of Search .......................... 252/464, 466 J

[56] References Cited
UNITED STATES PATENTS

| | | |
|---|---|---|
| 2,783,185 | 2/1957 | Hughes et al. ................. 252/464 X |
| 3,179,694 | 4/1965 | Van Eygen et al. ............. 252/464 X |
| 3,338,952 | 8/1967 | Callahan et al. ............... 252/464 X |
| 3,428,575 | 2/1969 | Pispers et al. ................. 252/464 |
| 3,544,616 | 12/1970 | Grasselli et al. ................ 252/464 X |
| 3,625,867 | 12/1971 | Yoshino et al. ................ 252/464 X |
| 3,651,164 | 3/1972 | Tabler et al. .................. 252/464 X |
| 3,668,265 | 6/1972 | Tabler et al. .................. 252/464 X |
| 3,697,448 | 10/1972 | Johnson et al. ................ 252/464 |

Primary Examiner—Paul F. Shaver

[57] ABSTRACT

Catalysts comprising iron, nickel or cobalt, and antimony or arsenic supported on alumina having relatively few pores smaller in diameter than 500 A and a surface area not less than 2 m$^2$/g contributed by pores having diameters larger than about 500 A are used for selective hydrogenation of hydrocarbons.

9 Claims, No Drawings

ALUMINA-SUPPORTED CATALYSTS HAVING SUBSTANTIAL AREA IN LARGE PORES

This is a division of my application Ser. No. 81,600 filed Oct. 16, 1970, now U.S. Pat. No. 3,726,936.

This invention relates to selective hydrogenation of hydrocarbons.

In one of its more specific aspects, this invention relates to the selective hydrogenation of hydrocarbon-containing streams over alumina-supported nickel-arsenic catalysts having a substantial surface area in large pores.

It is known that catalysts comprising antimony and arsenic supported on alumina are useful for selective hydrogenation. For example, 1,5-cyclooctadiene can be selectively hydrogenated by nickel in combination with arsenic and alumina to cyclooctene, mixed olefins can be treated to reduce their content of sulfur compounds and carbonyl compounds, and acetylene can be selectively hydrogenated in ethylene streams. Similarly, such catalysts can also be used for the double bond isomerization of pentenes and for the selective hydrogenation of dienes in monoolefin streams.

Relatedly, catalysts comprising iron and arsenic supported on alumina are known to be effective in the selective hydrogenation of acetylenes in a diolefin stream.

This invention is directed to the discovery that this class of catalysts, as hereinafter defined, and these types of reactions, are improved if the support, preferably an alumina support, has relatively few or, preferably, has substantially no pores smaller in diameter than 500 A and has a surface area not less than 2 m²/g concentrated in pores having diameters larger than about 500 A. In other words, a substantial number of pores of the catalyst are at least 500 A in diameter and these pores contribute to the catalyst a surface area of at least 2 m²/g.

Catalysts in which the alumina processes these properties can be employed at lower reaction temperatures and with lower loading of nickel, iron and/or cobalt and antimony and/or arsenic than can be employed with the conventional aluminas which possess a relatively high surface area in a large number of small pores. Further, the loss of the aforementioned elements from the catalyst during service is minimized when employing the catalyst of this invention.

Commercially employed catalytic aluminas generally have comparatively large surface areas of from about 50 to about 200 m²/g, this surface area being provided by the presence of an extremely large number of pores having diameters less than 500 A and generally less than about 300 A.

The aluminas of the present invention, in contrast, have few and preferably no pores having diameters less than about 500 A. Consequently, the aluminas of this invention have relatively low surface areas. The aluminas of the present invention will have a total surface area of at least 2 m²/g and up to 10 m²/g or greater. The aluminas can initially possess such pore size distribution and surface areas or can be modified to the defined condition. It is to be understood that the aluminas which will possess the defined surface areas are not those inactive aluminas, such as the inert alpha-aluminas devoid of significant surface area, not practically employed as catalyst supports.

The aluminas can be modified to impart to them the defined pore size distribution and surface area in several ways. One method involves collapsing the small pores by sintering. Another method involves steam treatment at temperatures of about 1,300° to about 1,600°F., at which temperature the small pores can be collapsed and/or new larger pores can be formed. Other methods of pore-size adjustment can also be employed such as the treatment of inactive alpha-alumina with nitric acid or ammonium nitrate as shown in U.S. Pat. No. 2,800,518.

The catalyst of the present invention comprises the above-defined alumina associated with at least one of nickel, cobalt and iron and at least one of arsenic and antimony. Such catalysts, while conveniently referred to as arsenides or antimonides of nickel, cobalt and iron, do not necessarily contain those elements in stoichiometric proportions of such compounds. In general, the catalyst composite will be comprised of from about 0.001 to about 20, preferably from about 0.1 to about 3, weight percent of the nickel, cobalt or iron, or their mixture, calculated as the element, based upon the weight of the total composite. The arsenic or antimony, or their mixture, will be present in amounts within the range of about 0.001 to about 30, preferably from about 0.1 to about 3, weight percent based upon the weight of the total composite.

The nickel, cobalt or iron, or their mixtures can be brought into association with the alumina by a number of known methods. They can be deposited simultaneous with the arsenic and/or antimony by coimpregnation or by coprecipitation, either in inorganic or organic forms from inorganic or organic media. Similarly, coimpregnation or coprecipitation can be carried out in a plurality of steps in any one of which any desired component can be associated with the alumina.

Whatever the method of preparation, the catalyst is washed free of undesirable nonvolatile materials, dried and calcined at the usual temperatures in air. Thereafter, the catalyst is reduced in hydrogen by conventional techniques, for example, in a stream of hydrogen at about 750°F. for 12 hours.

The catalyst of this invention can be employed in any form such as pellets, and in forms of any size.

The catalysts of this invention can be employed in the treatment of a large number of feedstocks. It is applicable to the selective hydrogenation of olefinic feedstocks and to the hydrogenation of acetylenic compounds, organic sulfur compounds, organic peroxides, carbonyl compounds, cyclic and acylic polyenes and the like, contained in feedstocks of any nature.

Depending upon the purpose for which the invention is employed, the applicable feedstream is brought into contact with hydrogen and with the catalyst at a temperature within the range of about 75°F. to about 750°F., preferably from about 150°F. to about 500°F. at a pressure within the range of from about atmospheric to about 1,000 psig and at a feed rate within the range of from about 0.1 to about 10 LHSV. Hydrogen is introduced into the contacting zone in quantities sufficient to provide a molar ratio of hydrogen to feed from about 0.1 to 1 to about 5 to 1. Materials such as carbon monoxide can be introduced into the reaction zone in an amount of from about 100 to about 5,000 ppm of feedstock to influence the selectivity of the process.

The process can be carried out employing the catalyst as a fixed bed and the desired products can be recovered from the reaction effluent with any portion of the effluent being recycled to the reaction zone.

The method of this invention is illustrated by the following example in which comparative data are presented for three catalysts, one of which was the catalyst of this invention.

EXAMPLE

The following data present the results of individual runs made with each of three catalysts. Two of the catalysts, catalysts A and B, were substantially identical but were subjected to different periods of operation.

Catalyst C is the catalyst of this invention.

Catalysts A and B were individually prepared by dissolving 98.5 g of $Ni(NO_3)_2 \cdot 6H_2O$ in 1,200 ml of water. Flame-hydrolyzed alumina (Alon C) in an amount of 150 g was stirred into the solution and 32.1 g of $H_3AsO_4$ in 300 ml water were added to the mixture. A 14 percent aqueous ammonium hydroxide was added until the pH of the mixture was between 6.5 and 7.0. The mixture was diluted with water to a total volume of 3,500 ml, thoroughly stirred and filtered. The filter cake was dried and ground to about 8–20 mesh.

Catalyst C, the catalyst of this invention, was prepared by dissolving 3.4 g $H_3AsO_4$ in 100 ml water in which solution 12.3 g $Ni(NO_3)_2 \cdot 6H_2O$ were dissolved. About 100 g large pore alpha-alumina in the form of ⅛ inch diameter cylinders were introduced into the solution in which they were allowed to stand for a sufficient period to insure impregnation. The unabsorbed solution was removed from the alumina cylinders, the cylinders were substantially dried and then heated to 1,000°F. at which temperature they were maintained for 30 minutes.

Each of catalysts A, B and C was placed individually in a fixed bed reactor and reduced by passing hydrogen in contact with the catalyst at a rate of about 2700 GHSV, at a temperature of 800°F. and at a pressure of about 350 psig for about 16 hours. The temperature of each catalyst was then reduced to about 150°F.

Each catalyst was then individually contacted with a feed comprising, volumetrically, 33 percent ethylene, 66 percent hydrogen, 1000 ppm acetylene, 1000 ppm carbon monoxide and 100 ppm ethane at the operating conditions listed below. The feed was introduced at a gaseous hourly space velocity of 5,000 with the reaction temperature being adjusted in each instance to maintain the acetylene content in the reactor effluent at 1 ppm or less.

Operating conditions and results were as follows:

In the above data, surface area determinations in pores greater than 500 and 1,000 A in diameter was determined by mercury intrusion, that in pores greater than 20 A in diameter was determined by nitrogen adsorption, the latter values being substantially a measure of the total surface area.

The above data indicate that the catalyst of this invention has a greater ability than the comparison catalysts to hydrogenate the acetylene at low temperature. Further, this was accomplished at considerably lower loading of the catalyst with nickel and arsenic. Additionally, the loss of arsenic from the catalyst of this invention was considerably less in terms of percent loss per hour of operating time than was the loss experienced by the comparison catalysts.

In consideration of the above results in view of the substantial differences in nickel and arsenic content of the catalysts, the catalysts of the present invention is a decidedly superior catalyst.

It will be evident from the foregoing that various modifications can be made to the method of this invention. Such, however, are considered as being within the scope of the invention.

What is claimed is:

1. A catalyst consisting essentially of a porous alumina support, at least one metal selected from the group consisting of nickel, iron and cobalt and at least one material selected from the group consisting of antimony and arsenic, said catalyst being in a reduced state, a substantial portion of the surface area of said support being in pores having a diameter not less than 500 A, said pores of said diameter comprising a surface area of not less than 2 square meters per gram of said catalyst.

2. The catalyst of claim 1 in which said support has a surface area within the range of from about 2 to about 10 square meters per gram.

3. The catalyst of claim 1 in which said support has a surface area of about 2.4 square meters per gram in pores having diameters greater than 1,000 A, a surface area of about 2.8 square meters per gram in pores having diameters greater than 500 A and a surface area of about 4.7 square meters per gram in pores having diameters greater than 20 A.

4. The catalyst of claim 1 in which said metal is present in an amount within the range of from about 0.001 to about 20 weight percent of said catalyst and said material is present in an amount within the range of from about 0.001 to about 30 weight percent of said catalyst.

| Catalyst | A | B | C |
|---|---|---|---|
| Catalyst Properties, New | | | |
| Surface Area, m²/g | | | |
| in pores > 1000 A dia. | 0.1 | 0.1 | 2.4 |
| in pores > 500 A dia. | 1.0 | (estimated) 1.0 | 2.8 |
| in pores > 20 A dia. | 70 | do. 4.7 | |
| Composition | | do. | |
| Nickel, Wt. % | 9.8 | (estimated) 9.8 | 0.94 |
| Arsenic, Wt. % | 9.1 | do. 0.1 | 0.66 |
| Operating Conditions | | | |
| Temperature, °F. | 220 | 224 | 189 |
| Product Analysis | | | |
| Acetylene, ppm | <1 | <1 | 1 |
| Ethane, Wt. % | 0.03 | 0.22 | 0.03 |
| Catalyst Properties, Used | | | |
| After hours use | 111 | 740 | 363 |
| Nickel, Wt. % | 8.6 | 8.4 | 0.89 |
| Arsenic, Wt. % | 6.3 | 4.3 | 0.54 |

5. The catalyst of claim 1 in which said catalyst contains a mixture of nickel, cobalt and iron and a mixture of arsenic and antimony.

6. The catalyst of claim 5 in which said mixture of nickel, cobalt and iron is present in an amount within the range of from about 0.001 to about 20 weight percent of said catalyst and said mixture of arsenic and antimony is present in an amount within the range of from about 0.001 to about 30 weight percent of said catalyst.

7. The catalyst of claim 6 in which said mixture of nickel, cobalt and iron is present in an amount within the range of from about 0.1 to about 3 weight percent of said catalyst and said mixture of arsenic and antimony is present in an amount within the range of from about 0.1 to about 3 weight percent in said catalyst.

8. The catalyst of claim 3 in which said catalyst contains about 0.94 weight percent nickel and about 0.66 weight percent arsenic.

9. The catalyst of claim 5 in which said mixture of nickel, cobalt and iron is present in an amount of about 0.94 weight percent of said mixture of arsenic and antimony is present in an amount of about 0.66 weight percent.

* * * * *